(12) United States Patent
Byerley (10) Patent No.: US 8,602,078 B2
(45) Date of Patent: Dec. 10, 2013

(54) TRANSFER RING OR DRUM APPARATUS HAVING ADJUSTABLE CIRCUMFERENCE

(75) Inventor: Mark S. Byerley, Greenback, TN (US)

(73) Assignee: BPS Engineering, LLC, Greenback, TN (US)

( * ) Notice: Subject to any disclaimer, the term of this patent is extended or adjusted under 35 U.S.C. 154(b) by 105 days.

(21) Appl. No.: 13/134,683

(22) Filed: Jun. 14, 2011

(65) Prior Publication Data

US 2011/0303366 A1 Dec. 15, 2011

Related U.S. Application Data

(60) Provisional application No. 61/397,657, filed on Jun. 15, 2010.

(51) Int. Cl.
*B29D 30/24* (2006.01)
(52) U.S. Cl.
USPC .................. 156/406.2; 156/417; 156/418
(58) Field of Classification Search
USPC .............. 156/406.2, 414, 417–420; 249/180, 249/181, 185
See application file for complete search history.

(56) References Cited

U.S. PATENT DOCUMENTS

| 3,038,526 | A | * | 6/1962 | Brey | 156/420 |
| 3,765,987 | A | * | 10/1973 | Brey | 156/415 |
| 3,767,509 | A | * | 10/1973 | Gazuit | 156/415 |
| 5,203,947 | A | * | 4/1993 | Boeker | 156/417 |
| 5,635,016 | A | | 6/1997 | Byerley | |

\* cited by examiner

*Primary Examiner* — Geoffrey L Knable
(74) *Attorney, Agent, or Firm* — Michael E. McKee (57) ABSTRACT

Tire-making apparatus (20) defining an outer or inner circumference (18) to serve as a forming surface or as a circumference-engaging surface, respectively, utilizes a frame (16) having a central axis (52) and a plurality of multi-sectional segments (28) which are moveable radially with respect to the central axis and include arcuate surfaces which collectively define the apparatus circumference. Each segment includes a primary section (60) and a secondary section (62) which flanks the primary section. The primary and secondary sections are connected so that as the segments are moved radially of the central axis, the primary and secondary sections move relative to one another along the circumference of the apparatus to help maintain the uniformity, or roundness, of the surface of the circumference collectively defined by the segments.

8 Claims, 10 Drawing Sheets

TRANSFER RING OR DRUM APPARATUS HAVING ADJUSTABLE CIRCUMFERENCE

The benefit of Provisional Application Ser. No. 61/397,657, filed Jun. 15, 2010 and entitled TRANSFER RING OR DRUM APPARATUS HAVING ADJUSTABLE CIRCUMFERENCE, is hereby claimed. The disclosure of this referenced provisional patent application is incorporated herein by reference.

BACKGROUND OF THE INVENTION

This invention relates generally to tire-making equipment and relates, more particularly, to apparatus which defines an outer circumference, or circumferential surface, which serves as a forming surface or for grasping the inner surface of a tubular (e.g. tire-shaped) object or for defining an inner circumference for grasping the outer surface of a circular, tubular or round object.

The tire-making equipment with which this invention is to be compared includes belt and tread drums whose outer circumferential surface is capable of expanding and contracting and a transfer ring whose inner circumferential surface is capable of expanding and contracting. In the case of a belt and tread drum, the capacity of the outer circumferential surface to expand and contract accommodates the removal of a completed package from the drum circumference and enables a single drum to be used to form belt and tread drums of alternative diameters. In the case of a transfer ring, the capacity of the inner circumferential surface to expand and contract enables the transfer ring to grasp or release the outer circumference of a belt and tread package when the transfer ring is positioned thereabout.

Conventional designs of the circumferential surfaces of such tire-making equipment involve the use of a plurality of multi-sectional segments disposed about a common centerline and whose outer or inner surfaces collectively define the circumferential surfaces. Preferably, such multi-sectional segments are capable for moving relative to one another during the equipment expansion or contraction process so that the uniformity (i.e. the rounded nature) of the circumferential surface is not appreciably sacrificed. Unless such a uniformity of the circumferential surface is preserved between the expanded and contracted conditions of the equipment, bumps or non-rounded regions which may otherwise be formed about the circumferential surface are likely to contribute to inaccuracies formed within a tire component built upon or engaged by the circumferential surface of the equipment.

The multi-sectional segments of one such design, such as is shown and described in U.S. Pat. No. 5,635,016, includes three sections comprised of an intermediate section and two flanking side sections which are hingedly connected to the intermediate section and which include a plurality of finger members which are moveable into and out of the spacings provided between finger members of a side section of an adjacent segment. Furthermore, the side sections of each segment are interconnected with the respective side sections of the adjacent segments disposed on each side of the segment so that the movement of the segments radially inwardly or outwardly relative to the centerline of the equipment (for the purpose of expanding or contracting the equipment) results in a forced hinged movement of the several respective side sections relative to the intermediate section in a manner which reduces the extent of nonuniformity of the circumferential surface defined by the multi-sectional segments.

However, conventional designs such as that of the referenced patent, do not accommodate an expansion or contraction of the circumferential surface of the equipment through a relatively broad range without appreciably sacrificing the uniformity, or roundness, of the circumferential surface of the equipment.

Accordingly, it is an object of the present invention to provide a new and improved equipment of the aforedescribed class whose circumferential surface can be expanded or contracted through a relatively broad range of diameters without appreciably sacrificing the uniformity of the circumferential surface.

Another object of the present invention is to provide such equipment which is relatively uncomplicated in structure, yet effective in operation.

SUMMARY OF THE INVENTION

This invention resides in an apparatus defining an outer circumference or an inner circumference to serve as a forming surface or as a circumference-engaging surface, respectively, in a tire-making process.

The apparatus includes a frame having a central axis and a plurality of multi-sectional segments mounted by the frame in side-by-side relationship about said central axis thereof. The segments are radially moveable inwardly and outwardly with respect to the central axis of the frame and include arcuate surfaces which collectively define the circumference of the apparatus.

At least one segment includes a primary section and a secondary section disposed to one side of the primary section. In addition, the apparatus includes means for connecting the secondary section to the primary section so that as the segments are moved radially inwardly and outwardly with respect to the central axis of the frame, the primary and secondary sections move relative to one another along the circumference of the apparatus.

DETAILED DESCRIPTION OF AN ILLUSTRATIVE EMBODIMENT

Figure 1:
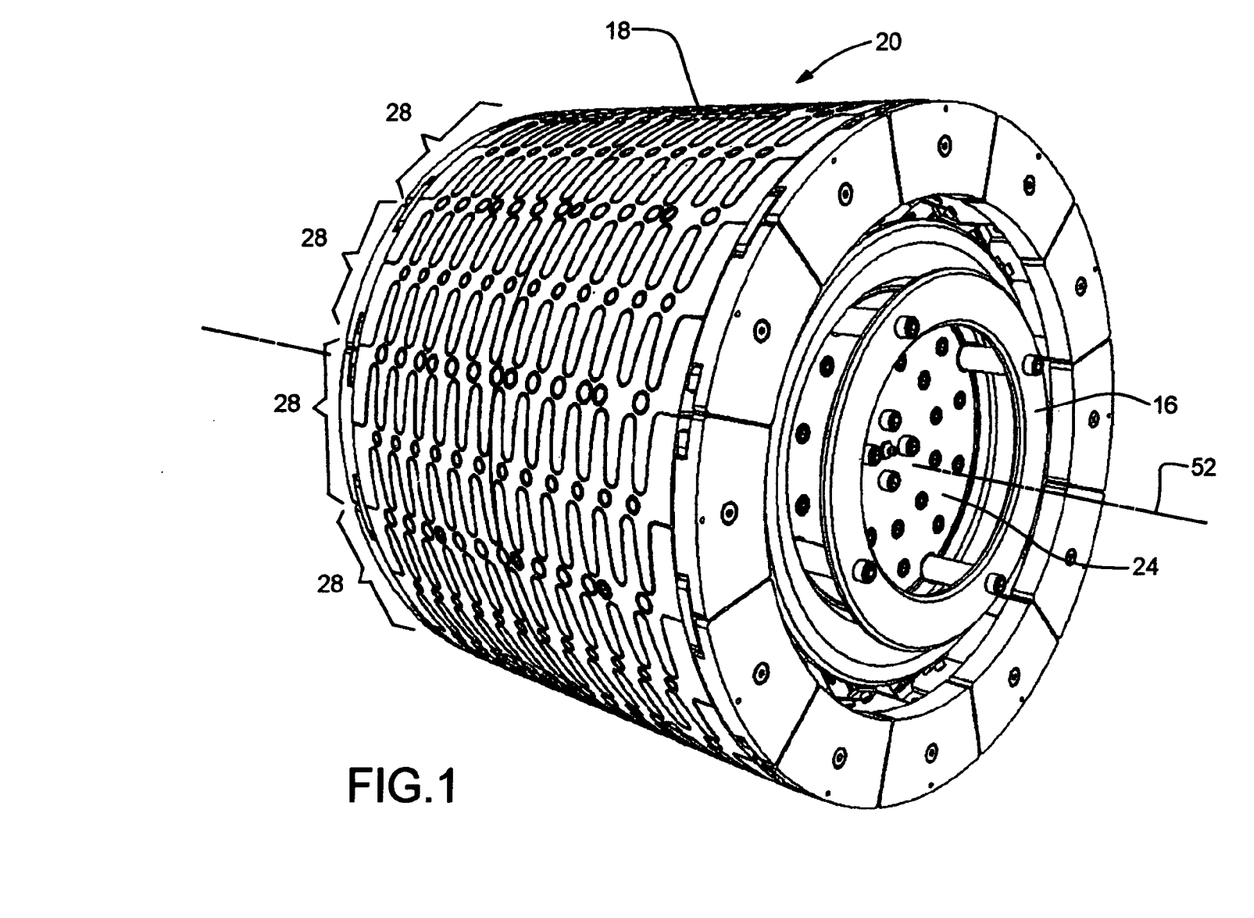
FIG. 1 is a perspective view illustrating schematically a belt and tread drum in which features of the present invention are incorporated.
Figure 2:
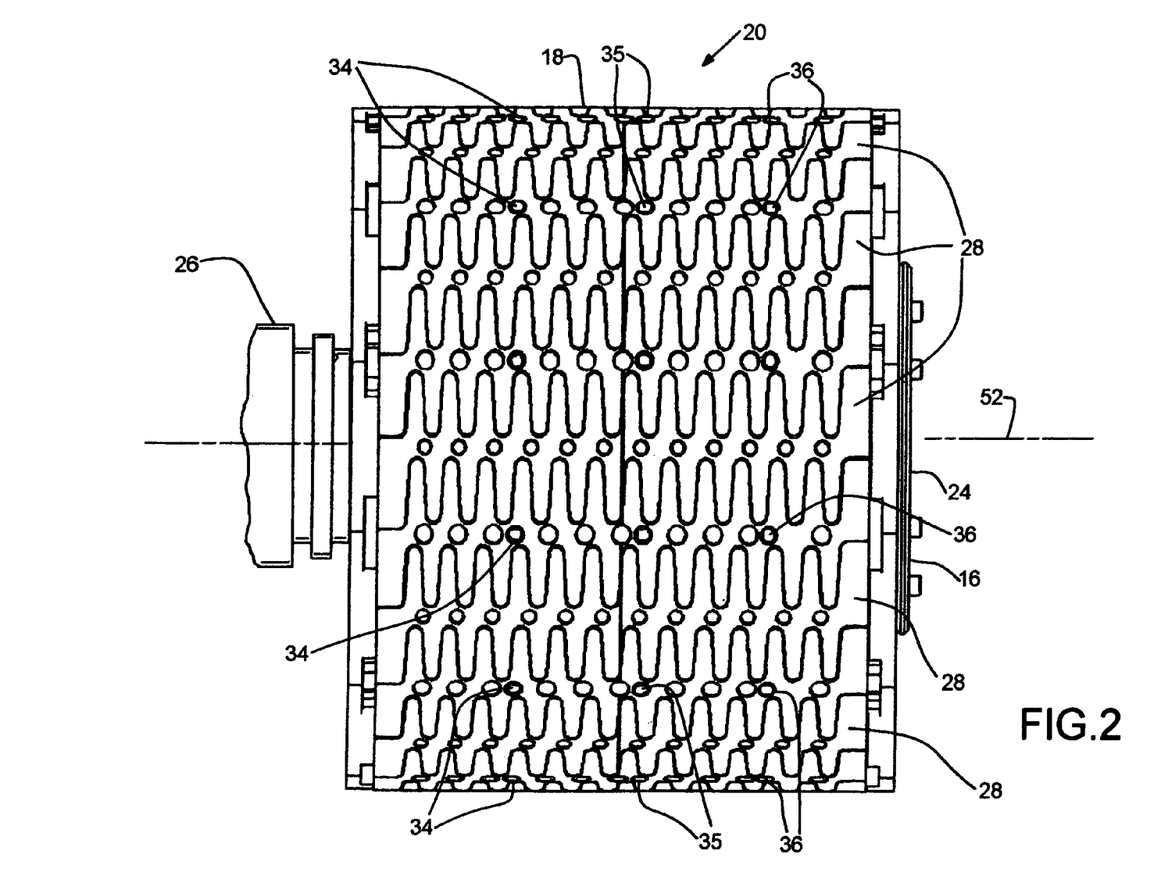
FIG. 2 is a side view of the belt and tread drum of FIG. 1.
Figure 3:
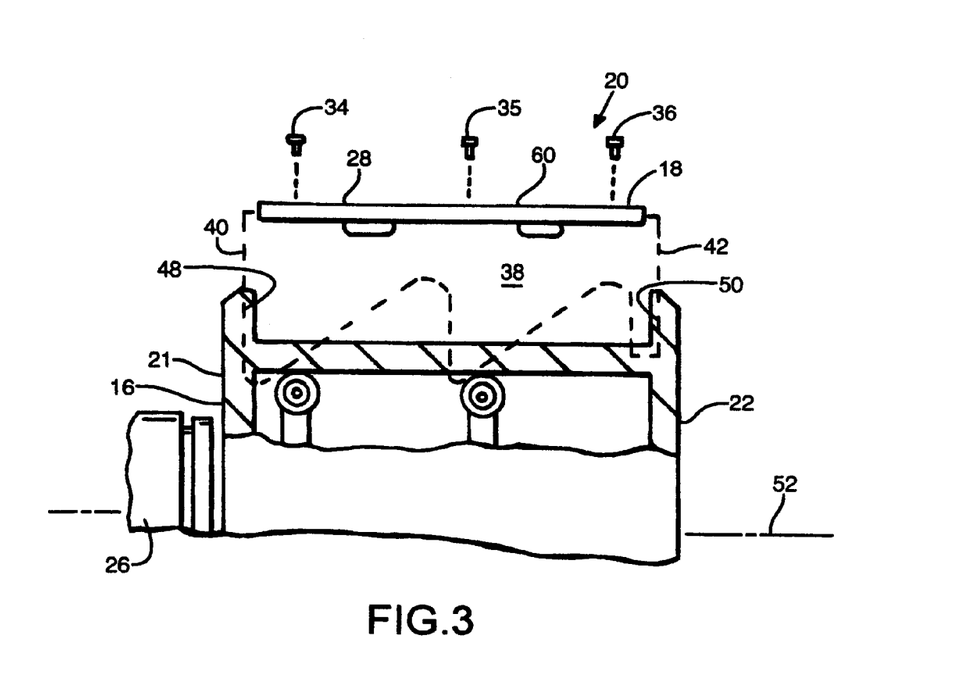
FIG. 3 is a fragmentary side view, shown partly in section, of the FIG. 1 drum illustrating schematically the means by which the diameter of the circumference, or the circumferential surface, of the drum is adjusted.

Turning now to the drawings in greater detail and considering first FIGS. 1-3, there is illustrated an embodiment, generally indicated 20, of a belt and tread drum within which features of the present invention are embodied. During the construction of a vehicle tire, the belt and tread drum 20 is used in the formation of a belt and tread package around the circumferential surface, indicated 18, of the drum 20.

The depicted belt and tread drum 20 includes a support frame 16 having a longitudinal central axis, or centerline, 52 and two opposite ends which, as best shown in the FIG. 3 view, are defined by first and second disc-shaped end plates 21 and 22, respectively. The frame 16 also includes a central body portion, generally indicated by the numeral 24 and which is disposed between the end plates 21 and 22. The body 24 is made up of a plurality of relatively movable components, the sum of whose movements results in controlled and measured change in the diameter of the outer circumference 18 of the body portion 24 to accommodate the manufacture of tires of various sizes (i.e. tires of different diameters). Selection and control over the maximum circumference of the drum 20 is provided for externally of the drum 20 by means of an adjustment mechanism 26 (FIG. 1).

More specifically, the body portion 24 of the depicted belt and tread drum 20 includes a plurality of circumference-defining, multi-section segments 28 (described herein) whose outer arcuate surfaces collectively define an arc or segment of the outer circumference of the drum 20. Each segment 28 is joined, as with bolts 34, 35 and 36, to a planar cam element 38 (FIG. 3) having two opposite side ends 40 and 42 which are slidably received in radially-extending slots provided in the inner surfaces 48 and 50 of the opposite end plates 21 and 22. With the cam element 38 mounted in this manner, the element 38 is radially movable with respect to the longitudinal centerline 52 of the drum 20. For a more complete description of the means by which the cam element 38 cooperates with circumference-defining segments for moving the segments radially toward or away from the drum centerline, reference can be had to U.S. Pat. No. 5,635,016, the disclosure of which is incorporated herein by reference. It will be understood, however, that the aforedescribed scheme for moving the segments 28 radially inwardly and outwardly with respect to the longitudinal centerline 52 of the frame 16 is intended as exemplary only, and that other structural schemes for moving the segments 28 of the depicted drum 20 radially inwardly and outwardly with respect to the longitudinal centerline 52 of the frame 16 can be had.

Figure 4:
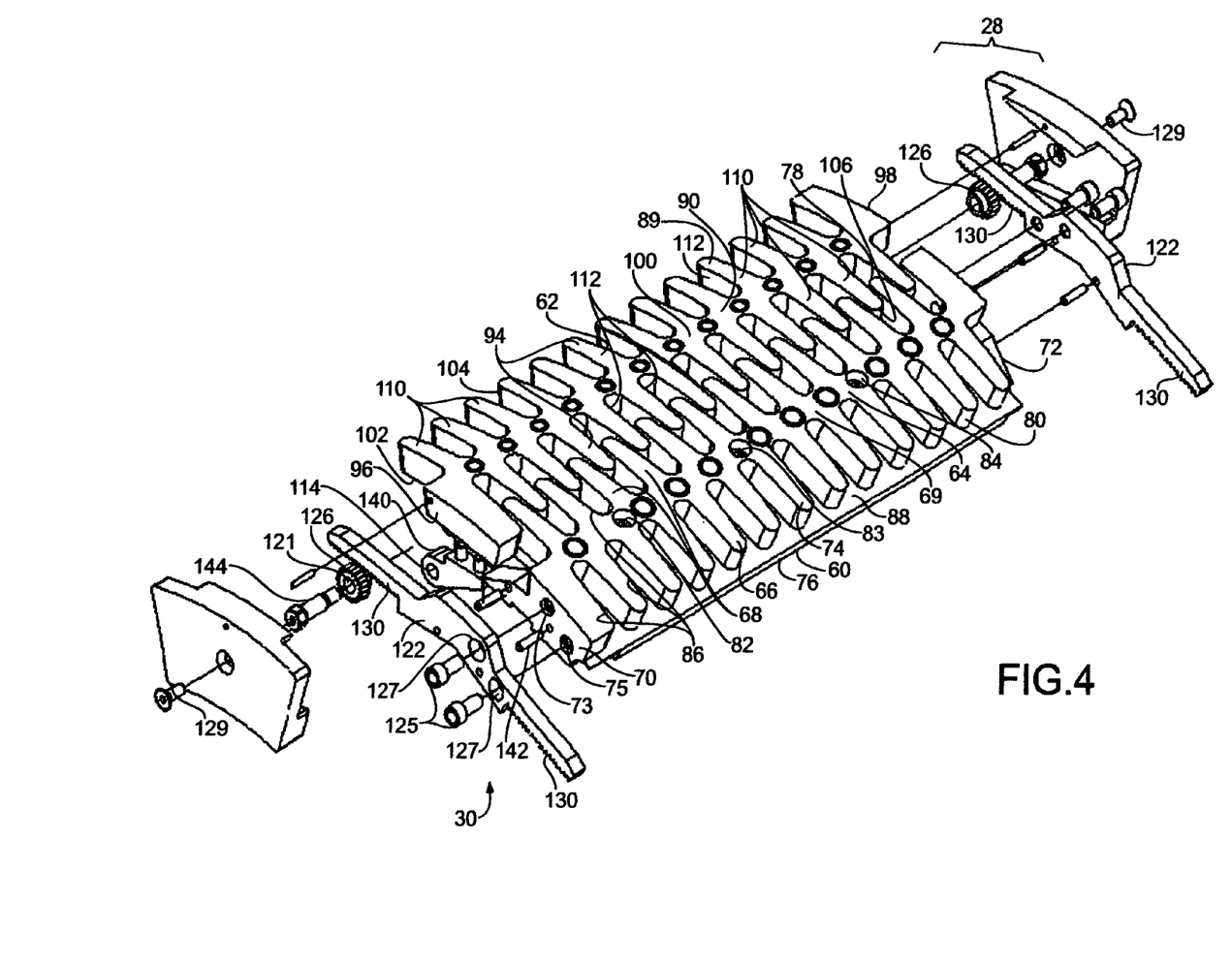
FIG. 4 is a fragmentary perspective view of a single multi-sectional segment and the associated rack and gear assembly of the FIG. 1 drum, shown exploded.

With reference to FIG. 4, there is illustrated a single multi-sectional segment 28 along with its associated rack and gear assembly 30 (described herein) used to connect components of the segment 28 to one another. Within the depicted drum 20, there are ten such multi-sectional segments 28 disposed around the drum 20 and which collectively define the overall outer circumference 18 (FIGS. 1-3), of the drum 20 and about which a tire component (not shown) can be built up. As will be explained in greater detail herein and during an adjustment of the drum diameter, the components of the segments 28 which collectively define the circumference 18 of the drum 20 move radially inwardly and outwardly relative to the drum centerline 52.

With reference still to FIG. 4, each segment 28 includes a primary section 60 and a secondary section 62 flanking the primary section 60 to one side thereof. Each primary section 60 includes a body 69 comprised of a mid-portion 64 and two slot-defining portions 66, 68 joined to so as to be positioned along opposite sides of the mid-portion 64. Each of the mid-portion 64 and the slot-defining portions 66 and 68 extends substantially parallel to the longitudinal centerline 52 of the drum 20) between two opposite ends, indicated 70 and 72, of the section 60.

The body 69 of the primary section 60 includes outer and inner surfaces 74 and 76, respectively, and two opposite side edges 78, 80 which extend between the opposite ends 70, 72 of the body 69. In addition, the outer surface 74 of the body 69 is arcuate in shape (so as to provide a portion of the circumferential surface 18 of the drum 20), and the mid-portion 64 includes a set of spaced bores 82, 83 and 84 through which the mounting bolts 34, 35 and 36 (FIG. 2) extend so that the body 69 of the primary section 60 is securely attached, or joined, to a corresponding one of the planar cam element 38 (FIG. 3).

Each slot-defining portion 66 or 68 of a primary section 60 includes a plurality of spaced and substantially parallel gaps, or slots 86, which open both radially-outwardly of the outer surface 74 and outwardly of the body 69 along the side edges 78 and 80 thereof (i.e. about the circumference of the drum 20). Each slot 86 extends substantially linearly into the body 69 from the side edge 78 and 80 thereof for accommodating the movement of finger portions (described herein) of the secondary section 62 into or out of slots 86 from the side edge 78 and 80. In other words, the slots 86 are shaped to matingly accept the finger portions of an adjacent pair of secondary sections 62 when the finger portions are moved longitudinally into the slots 86. Along the same lines, the regions of the body 69 disposed between the slots 86 provide finger portions which are intended to be matingly accepted by the spacings provided between the finger portions of the secondary section 62 when moved longitudinally into the spacings.

In addition, each slot 86 includes an arcuate-shaped floor, or platform 88, against which the tips of the finger portions of the secondary section 62 are adapted to rest, or bear against, during use of the drum 20 and along which the finger portions of the secondary section 62 are permitted to slidably move as the finger portions are moved longitudinally into or out of the slots 86. In addition, a pair of internally-threaded bores 73, 75 are provided in each end 70 or 72 of the body 69 of the primary section 60 for a reason which will be apparent herein.

With reference still to FIG. 4, the secondary section 62 includes a body 89 including a mid-portion 90 and a plurality of finger portion-defining sections 94 which extend between two opposite ends 96, 98 of the body 89. The body 89 of the secondary section 62 includes outer and inner surfaces 100 and 102, respectively, and two opposite side edges 104, 106 which extend along the length of the body 89. Each of the outer and inner surfaces 100, 102 of the body 89 is arcuate in shape, and the outer surface 100 provides a portion of the circumferential surface 18 of the drum 20.

The finger portion-providing sections 94 of each secondary section 62 includes a plurality of substantially parallel finger portions 110 wherein each finger portion 110 is spaced from an adjacent finger portion 110 by a slot 112 which opens outwardly of the body 89 along the side edges 104 or 106 thereof (i.e. along the circumference of the drum 20). In addition, there is fixedly secured to the inner surface 102 of the secondary section 62 adjacent each end 96 and 98 thereof a boss member 140 having an internally-threaded bore 114 which is oriented substantially parallel to the central axis 52 of the drum 20. As will be apparent herein, the boss members 140 are used to rotatably support gear elements (described herein) of the rack and gear assembly 30 at the opposite ends of the secondary section 62.

Figure 5:
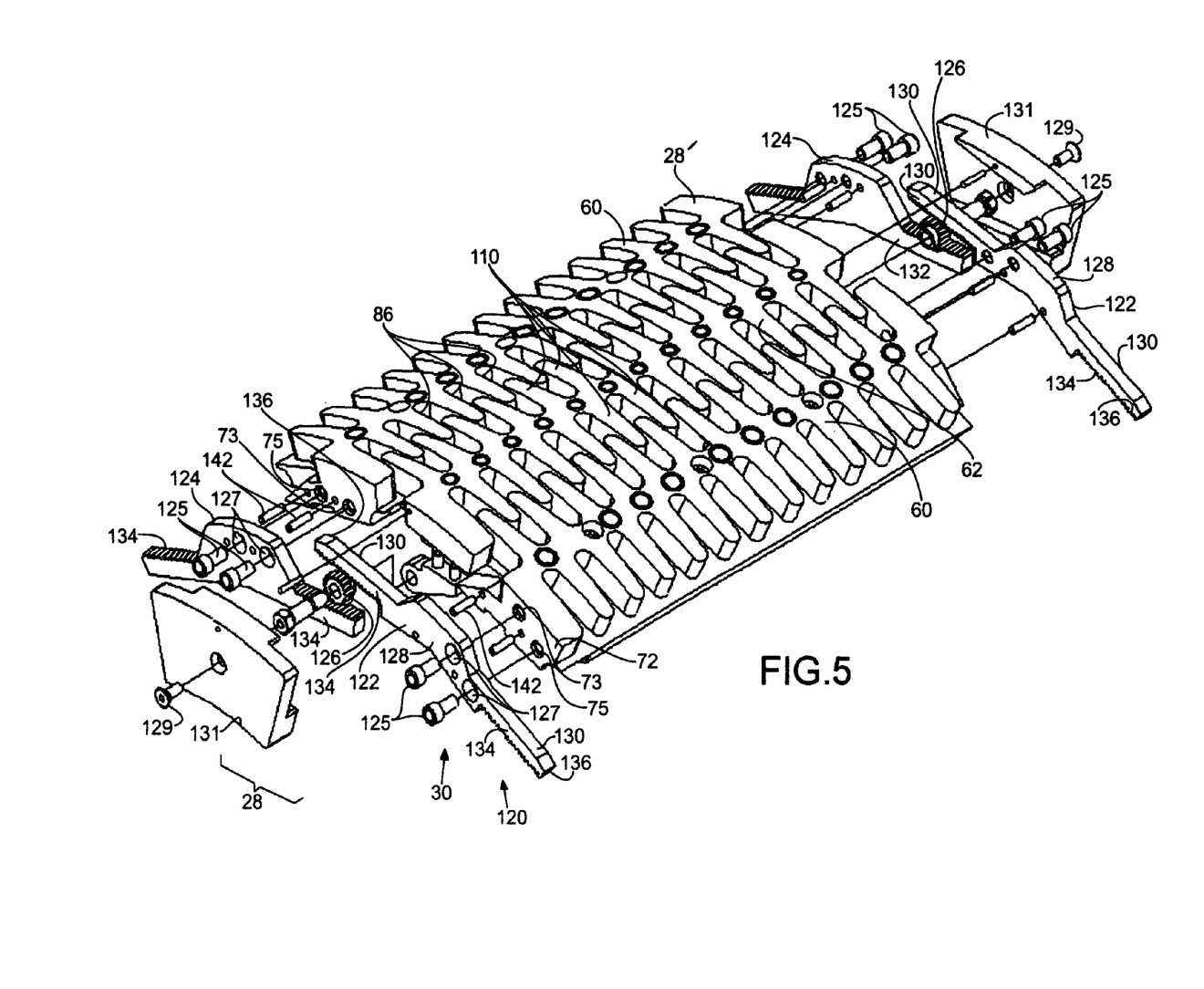
FIG. 5 is a view similar to that of FIG. 4 of a multi-sectional segment of the FIG. 1 drum and one (i.e. a primary) segment of an adjacent multi-sectional segment.

With reference to FIG. 5, there is illustrated the positional relationship of the primary and secondary sections 60 and 62 of each segment 28 to one another and to the primary section 60 of an adjacent (and identical) segment 28. Within the depicted drum 20, the segments 28 are regularly spaced around the central axis 52 of the drum 20 so that each primary section 60 is disposed between an adjacent pair of secondary sections 62, and each secondary section 62 is disposed between an adjacent pair of primary sections 60. This being the case and as a path is traced around the circumferential surface 18 of the drum 20, the secondary sections 62 alternate with the primary sections 60 or, stated another way, the primary sections 60 alternate with the secondary sections 62.

Furthermore and as can be best seen in FIG. 5, the finger portions 110 provided along each side edge 104 or 106 of the secondary section 62 are matingly accepted by (and are shaped complimentary to that of) the slots 86 provided along a corresponding side edge of the primary section 60 for movement of the finger portions 110 longitudinally into and out of the slots 86. It similarly follows that the spacings defined between the finger portions 110 of each secondary section 62 are adapted to matingly accept (and are shaped complimentary to that of) the finger portions defined between the slots 86 provided along a corresponding side edge of the primary section 60 as the finger portions 110 are moved longitudinally into and out of the slots 86.

With reference to both FIGS. 4 and 5, it is a feature of the present invention that the drum 20 includes means, generally indicated 120, for connecting the secondary section 62 of each segment 28 to the primary section 60 of its corresponding segment 28 (i.e. of the segment 28 containing the secondary section 62) and to the primary section 60 of an adjacent segment, indicated 28' in FIG. 5, so that as the segments are collectively moved radially inwardly and outwardly with respect to the central axis 52 of the frame 16, the secondary section 62 is moved with respect to the primary sections 60, 60 between which the secondary section 62 is positioned along the circumference 18 of the drum 20 as the finger portions 110 are moved longitudinally into or out of the slots 86. In other words, as the segments 28 are moved radially inwardly and outwardly with respect to the central axis 52, the secondary section 62 and the adjacent primary sections 60, 60 bodily move toward and away from one another about the central axis 52 and along a path corresponding with the curvature of the drum circumference 18. As will be apparent herein, this relative movement between the secondary section 62 and the adjacent primary sections 60, 60 during an adjustment of the drum diameter helps to maintain the uniformity, or roundness, of the circumference 18 collectively defined by the segments 28.

As best shown in FIG. 5 and within the depicted drum 20, the connecting means 120 is comprised of interlocking mechanisms including the rack and gear assembly 30 (introduced earlier) including a first elongated rack member 122 which is attached at each end 70 or 72 of the primary section 60 associated with (i.e. within the same segment 28 as) the secondary section 60, a second elongated rack member 124 which is attached at each end 70 or 72 of the primary section 60 of the segment indicated 28' in FIG. 5 disposed to the side of the secondary section 62 opposite the primary section 60 of the same segment 28 as the secondary section 62. In addition, the rack and gear assembly 30 further includes a gear element 126 which is rotatably attached, by way of a corresponding boss member 140, to the secondary section 62 at each end 96 or 98 thereof.

With reference to FIGS. 4-8, each rack member 122 or 124 includes a central portion 128 and a pair of elongated teeth-defining sections 130 or 132 which are joined to so as to extend from each side of the central portion 128. More specifically, each rack member 122 includes a pair of teeth-defining sections 130, and each rack member 124 includes a pair of teeth-defining sections 132. Each teeth-defining section 130 or 132 includes a base portion 134 disposed adjacent the central portion 128 and a tip portion 136 which extends from the base portion 134. Furthermore, each teeth-defining section 130 or 132 defines a set of teeth which are arranged along the length of the section 130 or 132. Each rack member 122 or 124 is secured to a corresponding end 70 or 72 of the body 69 of the primary section 60 with bolts 125 which extend through openings 127 (FIGS. 4 and 5) provided in the central portion 128 and secured within the internally-threaded bores 73, 75 provided in the ends 70, 72 of the body 69 of the primary section 60. Alignment of the openings 127 and the internally-threaded bores 73, 75 can be facilitated with the use of dowel pins 142 extending between the bodies of a primary section 60 and the corresponding rack member 122 or 124.

Inasmuch as the gear element 126 (described herein) is sandwiched between and in meshed relationship with the teeth which extend along the length of two teeth-defining sections 130 and 132 of two rack members 122 and 124 (i.e. one of which is attached to the primary section 60 of one segment 28 and the other of which is attached to the primary section 60 of an adjacent segment, indicated 28' in FIG. 5, the teeth which are defined along the length of the teeth-defining sections 130 of the first rack member 122 are directed downwardly (as viewed in FIGS. 5-8) while the teeth which are defined along the teeth-defining sections 132 of the second rack member 124 are directed upwardly (as viewed in FIGS. 5-8). Therefore and with the gear element 126 sandwiched therebetween, the teeth-defining sections 130 and 132 are in meshed relationship with the gear element 126 along the upper and lower surfaces (as viewed in FIG. 5) of the gear element 126.

With reference still to FIGS. 4 and 5, each gear element 126 has a substantially cylindrically-shaped body and a central bore 121 which extends through the central axis of the gear element 126. It is this central bore 121 that the element 126 is rotatably secured to a corresponding end 96 or 98 of the body 89 of the secondary section 62 by way of a shoulder bolt 144 which extends through the central bore 121 to accommodate rotation of the gear element 126 thereabout and whose threaded end is secured within the internally-threaded opening of a boss member 140. If desired, a molded guard member 131 (FIGS. 4 and 5) can, in turn, be secured to the shoulder bolt 144 with a bolt 129 whose shank extends through an opening provided in the guard member 131 and is threadably secured within a threaded opening provided in the head end of the shoulder bolt 144. The guard members 131 serve to cover, and thereby protect, the gear elements 126 supported at each end of the secondary section 62. It will also be understood that each gear element 126 defines radially outwardly-extending teeth which are adapted to mesh with, or matingly engage, the teeth of the teeth-defining sections 130 and 132 between which the gear element 126 is positioned.

Figure 6:
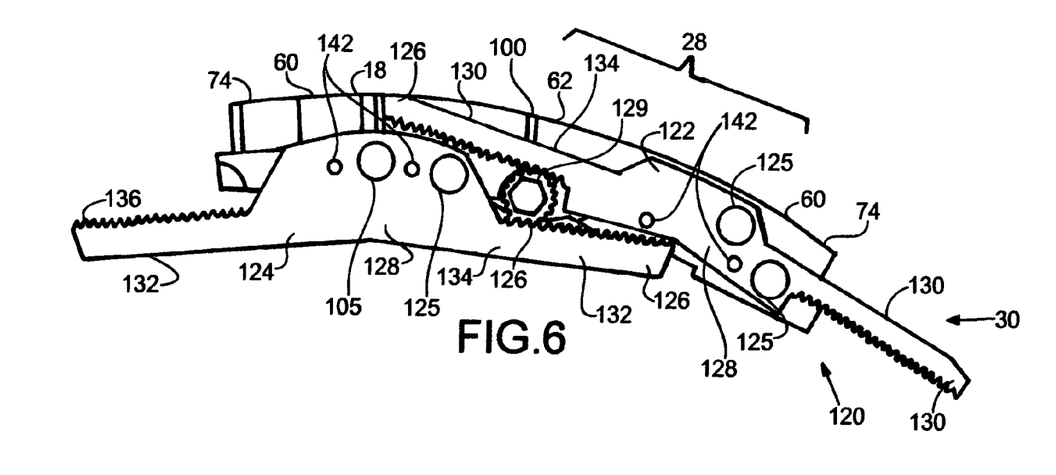
FIGS. 6-8 are end views of the segments of FIG. 5, shown assembled, illustrating the positional relationship of the segments as the circumference of the drum is increased or decreased between a small-diameter condition and a large-diameter condition.
Figure 7:
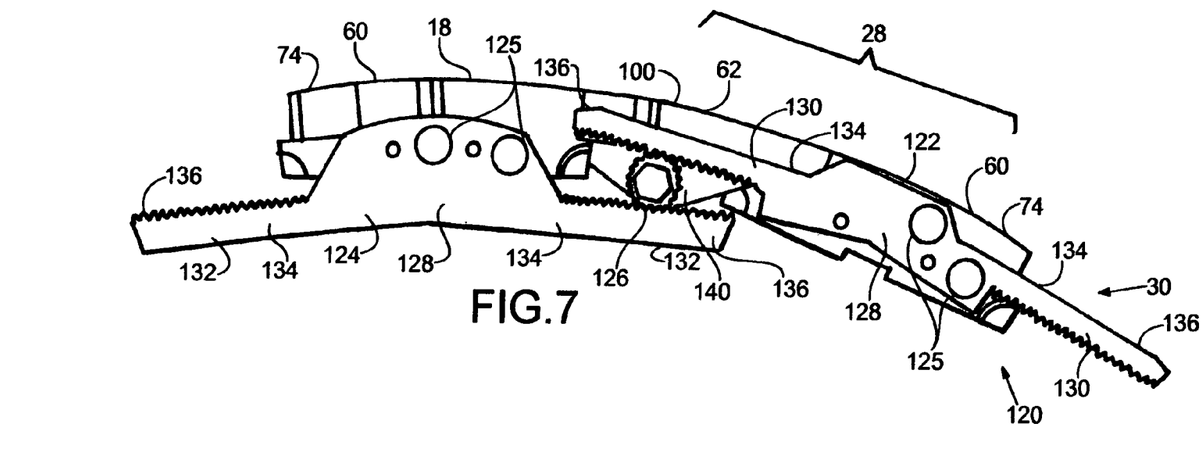
Figure 8:
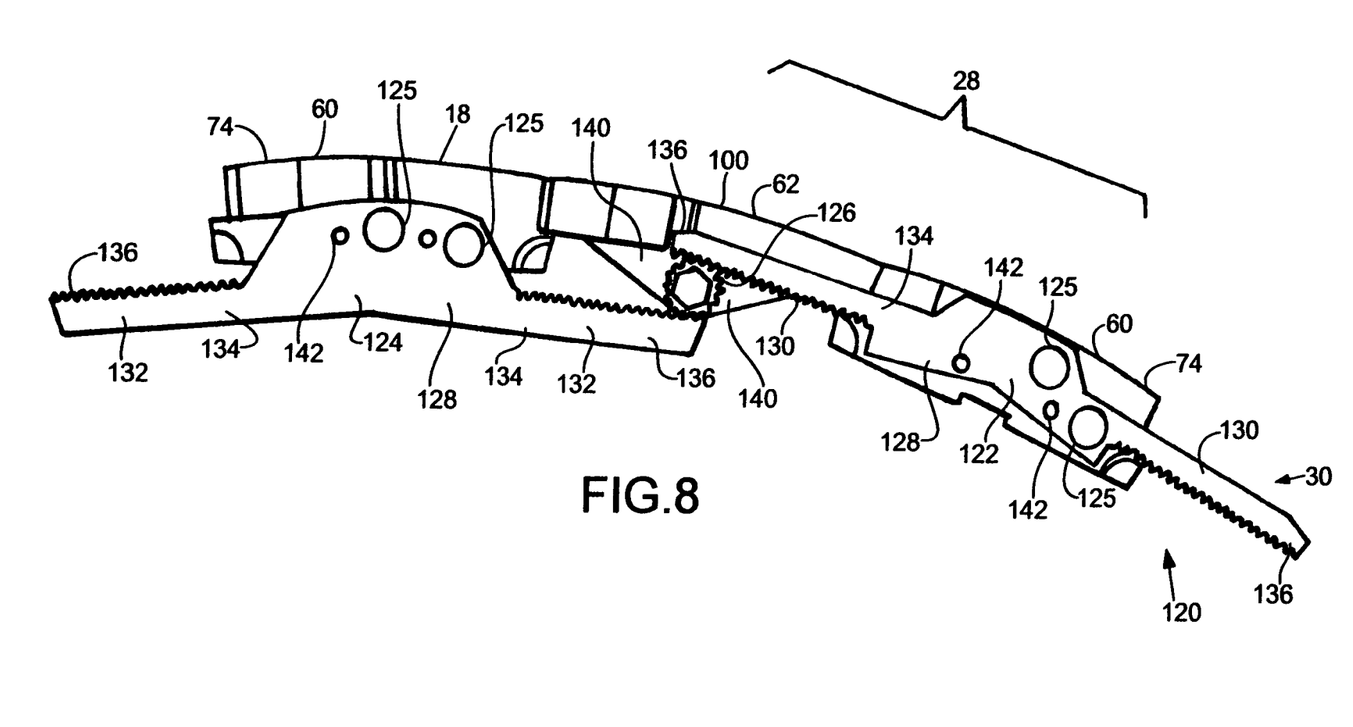
Figure 9:
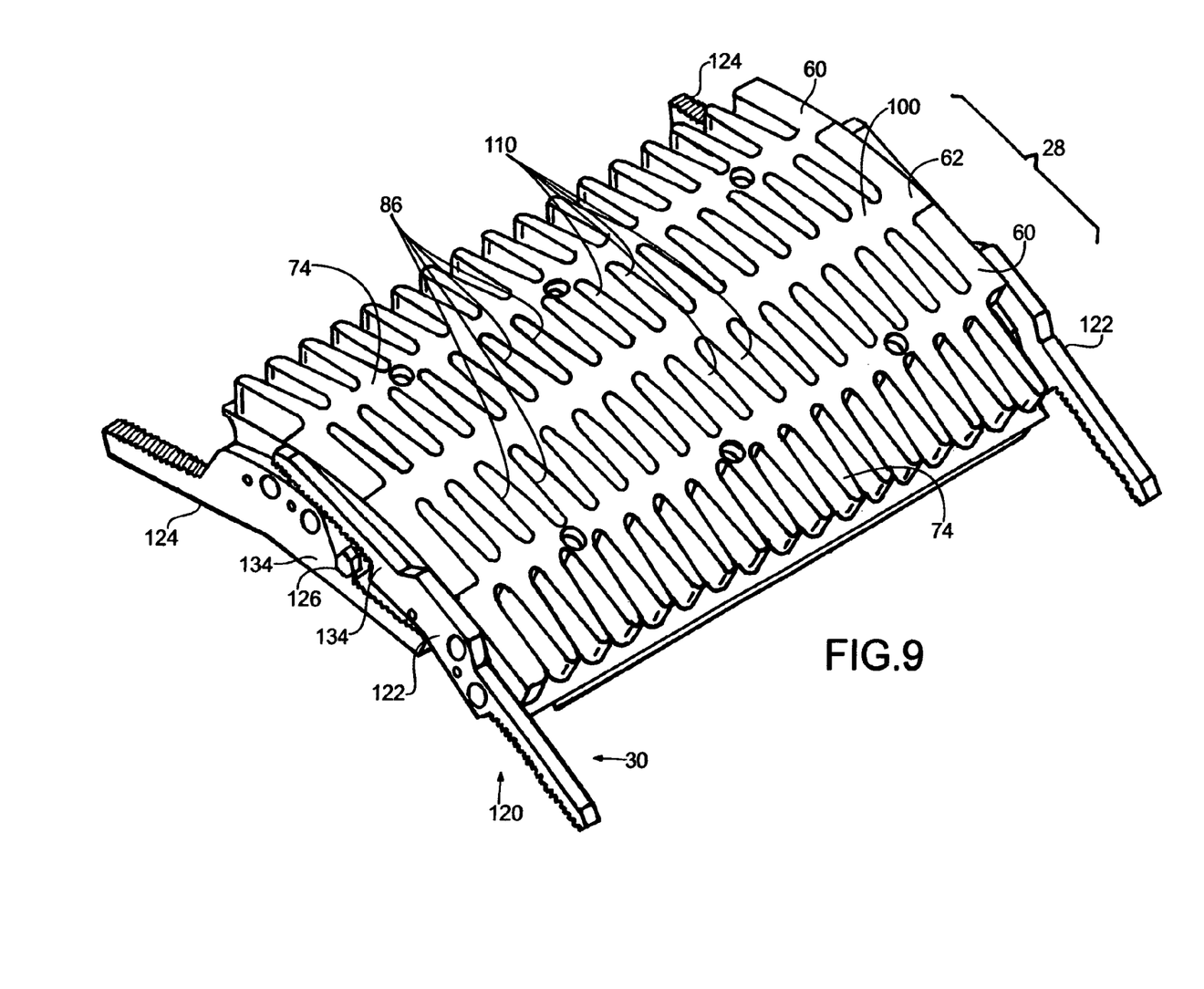
FIG. 9 is a perspective view of the multi-sectional segments depicted in the FIG. 6 view.
Figure 10:
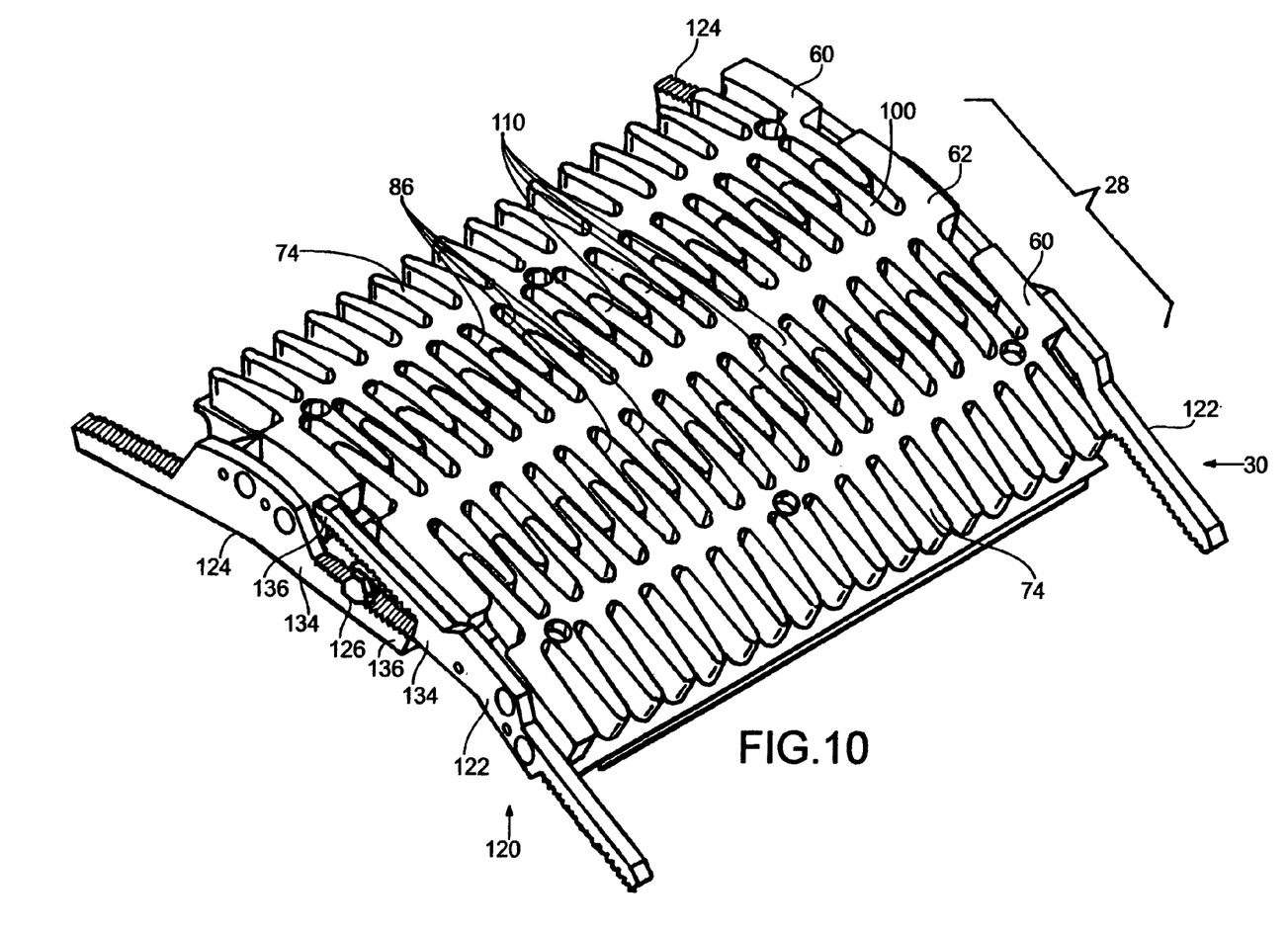
FIG. 10 is a perspective view of the multi-sectional segments depicted in the FIG. 7 view.
Figure 11:
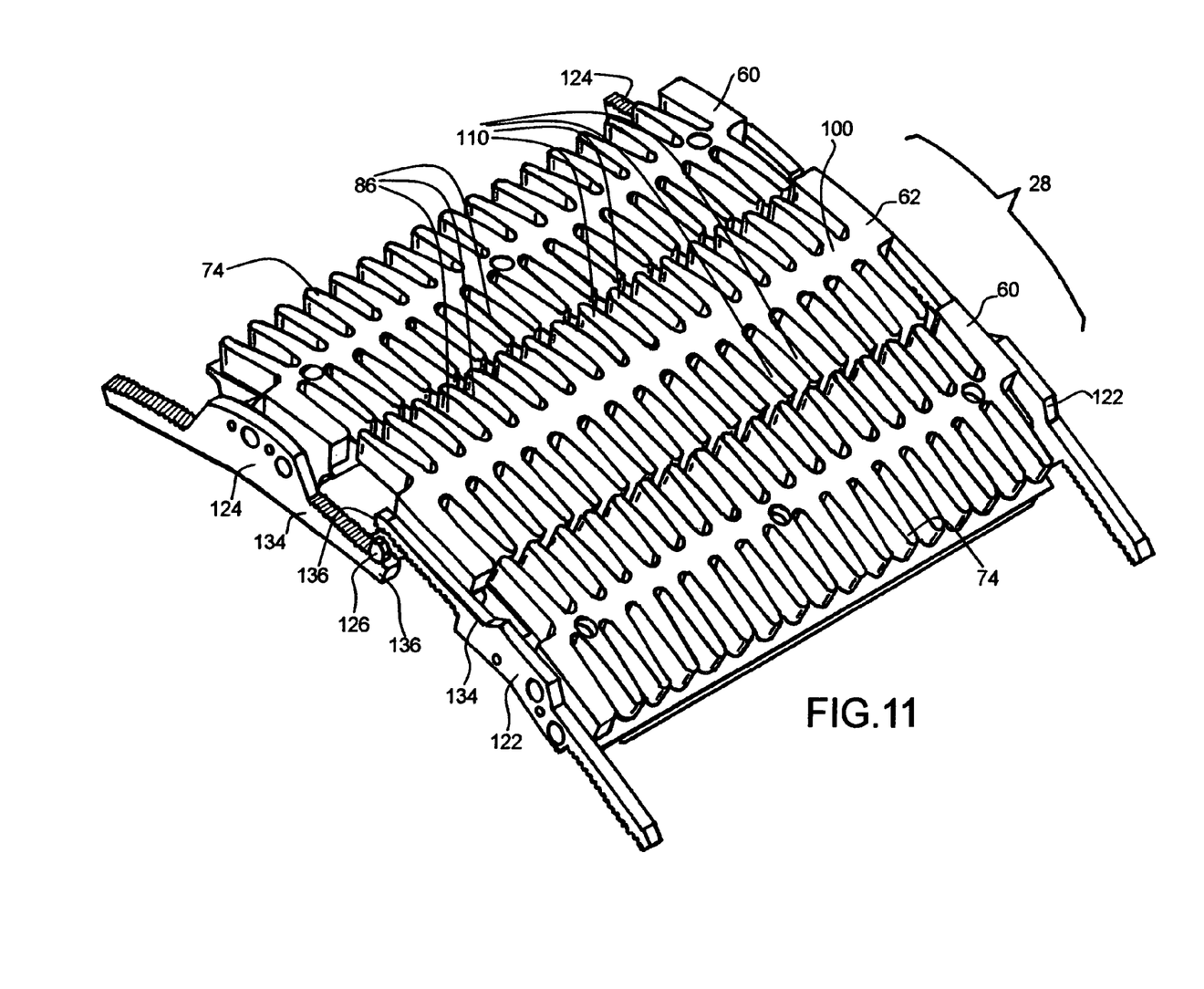
FIG. 11 is a perspective view of the multi-sectional segments depicted in the FIG. 8 view.

The operation of the segments 28 will now be described with reference to FIGS. 6-8 and the corresponding perspective views of FIGS. 9-11 in which the circumference 18 of the drum 20 is moved between a small-diameter condition (as depicted in FIGS. 6 and 9) and a large-diameter condition (as depicted in FIGS. 8 and 11). More specifically and as best shown in FIGS. 6 and 9, when the circumference 18 of the drum 20 is in its small-diameter condition, the primary sections 60, 60 of adjacent segments are positioned relatively close together while the rack member 122 associated with each of the primary sections 60, 60 are disposed in such a relationship with the gear element 126 that the gear element 126 is disposed adjacent the base portion 134 of each rack member 122 or 124. When in this small-diameter (FIG. 6) condition, the finger portions 110 of the secondary section 62 are fully accepted by the slots 86 of the primary sections 60, 60, as best seen in the perspective view of FIG. 9.

On the other hand and with reference to FIGS. 8 and 11, when the circumference 18 of the drum 20 is in its large-diameter condition, the primary sections 60, 60 of adjacent segments are positioned relatively far apart while the associated rack members 122, 124 are disposed in such a relationship with the gear element 126 that the gear element 126 is disposed adjacent the tip portion 136 of each rack member 122 or 124. When in this large-diameter (FIG. 8) condition, the finger portions 110 of the secondary section 62 are withdrawn from the slots 86 of the primary sections 60, 60, as best seen in the perspective view of FIG. 11.

It will be understood that at any position of the secondary section 62 between the small-diameter condition of FIGS. 6 and 9 and the large-diameter condition of FIGS. 8 and 11, the finger portions 110 of the secondary section 62 slidably engage the surface of the platform 88 of the adjacent primary sections 60, 60 disposed on opposite sides of the secondary section 62. This engagement between the (tips of) the finger portions 110 and the surface of the platform 88 of the primary sections 60, 60 ensures that each secondary section 60 is continually backed, and thereby supported in a stable manner, during a tire build up procedure performed with the drum 20. Moreover, such an engagement has been found to help maintain the orientation of the primary and secondary sections 60 and 62 so that the outer surfaces 74 and 100 thereof always face radially outwardly of the central axis 52.

By comparison and with reference to FIGS. 7 and 10, when the circumference 18 of the drum 20 is disposed about half-way between its small-diameter condition of FIG. 6 and the large-diameter condition of FIG. 8, the primary sections 60, 60 of adjacent segments 28, 28 and the associated rack members 122, 124 are disposed in such a relationship with the gear element 126 that the gear element 126 is disposed about half-way between the tip portion 136 of each rack member 122 or 124 and the base portion 134 thereof. When in this (mid-diameter) condition of FIG. 7, about one-half of the total length of the finger portions 110 of the secondary section 62 are accepted by the slots 86 of the primary sections 60, 60, as best seen in the perspective view of FIG. 10.

As the circumference 18 of the drum 20 is adjusted between its small-diameter (FIG. 6) and large-diameter (FIG. 8) conditions, the primary sections 60, 60 of the adjacent segments 28 move toward or away from the secondary section 62 disposed therebetween (and toward and away from one another) and the finger portions 110 of the secondary section 62 move into or out of the slots 86 of the primary sections 60, 60 along the circumference 18 of the drum 20 by a corresponding amount. As the primary sections 60, 60 are moved in this fashion and the rack members 122 and 124 are moved longitudinally toward or away from one another by a corresponding amount, the gear element 126 is rotated by the rack members 122 and 124 so that the secondary section 62 remains substantially centered between the primary sections 60, 60.

It follows from the foregoing that as the primary sections 60, 60 are moved toward or away from the secondary section 62 disposed therebetween from one another as the circumference 18 of the drum 20 is moved between its small-diameter (FIG. 6) and large-diameter (FIG. 8) conditions, the finger portions 110 of the secondary section 62 slidably move along the platform 88 of the primary sections 60, 60 with which the finger portions 110 are adapted to cooperate. Because the finger portions 110 of the secondary section 62 remain in engagement with the platform 88 of the primary sections 60, 60 in such a manner, the primary sections 60, 60 satisfactorily back, and thereby support, the secondary section 62 positioned therebetween. It will therefore be understood that all of the secondary sections 62 disposed around the circumference 18 of the drum 20 are satisfactorily backed by the primary sections 60 of the circumference-defining segments 28 when, for example, a tire component is built up around the circumference of the drum 20.

It also follows from the foregoing that an apparatus, such as the drum 20, has been described which defines an outer circumference 18 or an inner circumference to serve as a forming surface or as a circumference-engaging surface. Such an apparatus 20 includes a frame 16 having a central axis 52 and a plurality of multi-sectional segments 28 mounted upon the frame 16 and in side-by-side relationship about the central axis 52 thereof. The segments 28 are radially moveable inwardly and outwardly with respect to the central axis 52 of the frame 16 and include arcuate surfaces 74 and 100 which collectively define the circumference 18 of the apparatus 20.

In addition, each segment 28 includes a primary section 60 having two opposite side edges 78 and 80 and a secondary section 62 disposed adjacent the primary section 60 along one side edge thereof. Furthermore, the apparatus 20 includes means, indicated 120, such as the rack and gear assembly 30, for connecting the secondary section 62 to the primary section 60 so that as the primary and secondary sections 60 and 62 are moved radially inwardly and outwardly with respect to the central axis 52 of the frame 16, the secondary section 62 moves toward and away from the body of the primary section 60 along the circumference 18 of the drum 20 by a corresponding amount for maintaining the uniformity, or roundness, of the surface of the apparatus 20 along the circumference 18 thereof.

It also follows that the circumference of the drum 20 extends along an arc which surrounds and is substantially centered about the central axis 52 of the drum 20, each of the primary section 60 and the secondary section 62 has a circumference-defining surface 74 or 100 having a length which extends along the arc of the apparatus circumference, and the length of each primary and secondary section 60 or 62 has a center. Furthermore, as the primary and secondary sections 60 and 62 are moved radially inwardly and outwardly with respect to the central axis 52 of the drum 20, the primary and secondary sections 60, 62 move relative to one another so that the centers of the lengths of the primary and secondary sections 60 and 62 move toward and away from one another along the arc of the drum circumference.

Each of the primary and secondary sections 60 and 62, as well as the components of the rack and gear assembly 30, are rigid in nature (being constructed of metal or hard plastic) and so that the radius of curvature of the outer surfaces 74 and 100 of the primary and secondary sections 60 and 62 are fixed for each drum 20. However and as can be seen in the views of views of FIGS. 6-8, that the uniformity, or roundness, of the curvature of the drum 20 is substantially maintained by the primary and secondary sections 60 and 62 as the circumference 18 of the drum 20 is moved between its small-diameter (FIG. 6) condition and its large-diameter (FIG. 8) condition. Thus, tire components which are built up about the circumference of the drum 20 will possess an inner surface which is substantially free from indentation-forming regions or bumps or other characteristics which would affect the shape or dimensional accuracies of the completed component. Furthermore, the range of diameters through which the circumference 18 of the drum 20 can be adjusted is broader than the range of diameters through which drums which possess conventional multi-sectional segments can be adjusted, and the drum 20 is further advantageous in this respect.

In support of the foregoing, it has been found that the range of diameters of the circumference of a drum embodying the principles of the present invention is more than twice that of drum systems of the prior art. For example, the ratio of the largest diameter to the smallest diameter in old drum systems of the prior art is about 1.4 to 1.0 whereas the ratio of the largest diameter to the smallest diameter in a drum embodying the principles of the present invention is about 1.85 to 1.0. Consequently, there is no need to add on decks or spacers to a drum embodying the principles of the present invention in order to set the drum circumference at a drum diameter available at the extreme end of the range of possible diameters nor is there any need to stop a tire assembly process in order to fit or remove additional spacers or decks.

It will be understood that numerous modifications and substitutions can be had to the aforedescribed embodiment without departing from the spirit of the invention. For example, although the multi-sectional segments 28 of the aforedescribed embodiment 20 has been shown and described as having primary sections 60 which are attached directly to the planar cam element 38 (FIG. 3) while the secondary sections 62 essentially float between adjacent primary sections 60, 60, it will be understood that a drum in accordance with the present invention can embody multi-sectional segments whose secondary sections are attached directly to a planar cam element 38 while the primary sections essentially float between adjacent secondary sections.

Furthermore and although the present invention has been described herein in conjunction with a tire-building drum 20 having an outer circumference 18 about which tire components can be built, the principles of the present invention can be embodied within an apparatus having an outer circumference for grasping the inner surface of a tubular (e.g. tire-shaped) object or an apparatus having an inner circumference for grasping the outer surface of a circular, tubular or round object.

For example, the principles of the present invention can be embodied in a transfer ring for grasping a completed belt and tread package following completion of its build up and its release from a belt and tread drum by engaging the outer circumference of the package with the inner arcuate surfaces of the segments of the transfer ring. As is recognized in the vehicle tire industry, this engagement of the package-engaging surfaces (or shoes) of the transfer ring and the outer circumferential surface of the belt and tread package must ordinarily be effected carefully to avoid indentations in the package by the shoes. Otherwise, such indentations commonly later show up as imperfections in the finished vehicle tire. Furthermore and since the shoes of a transfer ring which embody the matingly-engaging segments in accordance with the principles of the present invention provide a continuous, or unbroken, package-engaging ring for grasping the outer circumferential surface of a belt and tread drum, and such a transfer ring is further advantageous in this respect.

Accordingly, the aforedescribed embodiment 20 is intended for the purpose of illustration and not as limitation.

The invention claimed is:

1. Apparatus defining an outer circumference or an inner circumference to serve as a forming surface or as a circumference-engaging surface, respectively, comprising:
    a frame having a central axis, and the apparatus circumference extends along an arc which surrounds and is substantially centered about the central axis;
    a plurality of multi-sectional segments mounted upon the frame and in side-by-side relationship about said central axis thereof, said segments being moveable radially inwardly and outwardly with respect to the central axis of the frame and including arcuate surfaces which collectively define the circumference of the apparatus;
    at least one segment including a primary section and a secondary section disposed to one side of the primary section wherein each of the primary section and the secondary section has a circumference-defining surface having a length which extends along the arc of the apparatus circumference, and the length of each primary and secondary section has a center, and
    means for connecting the secondary section to the primary section so that as the segments are moved radially inwardly and outwardly with respect to the central axis of the frame, the primary and secondary sections move relative to one another so that the centers of the lengths of the primary and secondary sections move toward and away from one another along the arc of the circumference of the apparatus; and
    the means for connecting includes means for coordinating the relative movement between the primary and secondary sections of the at least one segment with the movement of the at least one segment radially inwardly and outwardly with respect to the central axis of the frame wherein the means for coordinating includes mechanisms which interlock the primary and secondary sections together so that movement of the at least one segment radially inwardly and outwardly with respect to the central axis of the frame effects the movement of the primary and secondary sections relative to one another along the circumference of the apparatus, and wherein the mechanisms include a rack and gear assembly connected between the primary section and the secondary section.

2. The apparatus as defined in claim 1 wherein the rack and gear assembly includes a rotatable gear which is rotatably connected to one of the primary section or the secondary section of the at least one segment and a teeth-defining rack which is joined to the other of the secondary section or the primary section of the at least one segment, and the gear and teeth-defining rack are in meshed relationship with one another so that movement of the at least one segment radially inwardly or outwardly relative to the central axis of the frame effects the movement of the primary and secondary sections relative to one another as aforesaid.

3. The apparatus as defined in claim 2 wherein the primary and secondary sections include an arrangement of finger portions and cooperating slots for accepting the finger portions so that when the primary and secondary sections are moved relative to one another along the circumference of the apparatus, the finger portions move into and out of the cooperating slots.

4. Apparatus defining an outer circumference or an inner circumference to serve as a forming surface or as a circumference-engaging surface, respectively, in a tire-making process, said apparatus comprising:
    a frame having a central axis;
    a plurality of multi-sectional segments mounted upon the frame in side-by-side relationship about the central axis thereof, said segments being radially moveable inwardly and outwardly with respect to the central axis of the frame between expanded and contracted conditions and including arcuate surfaces which collectively define the circumference of the apparatus as the segments are moved radially inwardly and outwardly as aforesaid;
    each segment including a primary section and a secondary section which flanks the primary section of its corresponding segment, and the primary and secondary sections are arranged so that each secondary section is positioned between a pair of primary sections as a path is traced around the circumference of the apparatus; and means for connecting the secondary section of each segment to the pair of primary sections between which the secondary section is positioned so that movement of the segments radially inwardly and outwardly with respect to the central axis of the frame effects the movement of the secondary section and said pair of primary sections relative to one another along the circumference of the apparatus to help maintain the uniformity of the circumference collectively defined by the segments; and wherein the means for connecting includes mechanisms which interlock each secondary section to the pair of primary sections between which the secondary section is positioned so that movement of the segments radially inwardly and outwardly with respect to the central axis of the frame effects the movement of each secondary section relative to the pair of primary sections between which the secondary section is positioned along the circumference of the apparatus; and wherein the mechanisms includes a rack and gear assembly including a rotatable gear associated with one of the secondary section and said pair of primary sections and a teeth-defining rack having a length which is associated with the other of said pair of primary sections and the secondary section, and the rotatable gear and teeth-defining rack are in meshed relationship with one another so that movement of the segments radially inwardly and outwardly with respect to the central axis of the frame effects the movement of the secondary section and said pair of primary sections relative to one another along the circumference of the apparatus as aforesaid as the gear is rollably moved along the length of the teeth-defining rack.

5. The apparatus as defined in claim 4 wherein there are two teeth-defining racks, and each of the two teeth-defining racks is joined to a corresponding primary section of said pair of primary sections, and the gear is rotatably attached to the secondary section positioned between said pair of primary sections so as to be in meshed relationship with the two teeth-defining racks so that as the segments are moved radially inwardly and outwardly with respect to the central axis of the frame, the teeth-defining racks are moved relative to one another along the circumference of the apparatus as the gear rotates between the teeth-defining racks.

6. The apparatus as defined in claim 5 wherein the primary and secondary section of each segment include an arrangement of finger portions and cooperating slots for accepting the finger portions so that when the primary and secondary sections of each segment are moved relative to one another along the circumference of the apparatus, the finger portions move into and out of the cooperating slots.

7. In a tire-making apparatus including a frame having a central axis and further including a circumference about which tire components can be formed or with which tire components can be grasped and wherein the circumference is collectively defined by a plurality of multi-sectional arcuate-shaped segments mounted in a side-by-side relationship about the frame and which are moveable radially inwardly and outwardly with respect to the central axis of the frame to accommodate an adjustment of the diameter of the circumference of the apparatus and wherein the apparatus circumference extends along an arc which surrounds and is centered about the central axis of the frame, the improvement characterized in that:

each segment includes a primary section and a secondary section which flanks the primary section of its segment and wherein each of the primary section and the secondary section has a circumference-defining surface having a length which extends along the arc of the apparatus circumference, and the length of each primary and secondary section has a center;

one of the primary and secondary sections of each segment being joined to the frame of the equipment for movement of the joined primary or secondary section radially inwardly or outwardly with respect to the central axis of the frame during an adjustment of the diameter of the circumference of the apparatus; and the primary and secondary sections being connected to one another so that as the joined primary or secondary section is moved radially inwardly or outwardly with respect to the central axis of the frame, the other of the secondary or primary section bodily moves relative to the joined primary or secondary section so that the centers of the lengths of the primary and secondary sections move toward and away from one another along the arc of the circumference of the apparatus; and means for coordinating the relative movement between the primary and secondary section of each segment with the movement of the joined primary or secondary section radially inwardly and outwardly with respect to the central axis of the frame wherein the means for coordinating includes mechanisms which interlock the primary and secondary section of each segment together so that movement of the joined primary or secondary section radially inwardly and outwardly with respect to the central axis of the frame effects the movement of the primary and secondary sections relative to one another along the circumference of the apparatus and wherein the mechanisms include a rack and gear assembly connected between the primary section and the secondary section of each segment so that movement of the joined primary or secondary section radially inwardly and outwardly with respect to the central axis of the frame effects the movement of the primary and secondary sections relative to one another along the circumference of the apparatus by a corresponding amount.

8. The apparatus as defined in claim 7 wherein the primary and secondary sections include an arrangement of finger portions and cooperating slots for accepting the finger portions so that when the primary and secondary sections are moved relative to one another along the circumference of the apparatus, the finger portions move into and out of the cooperating slots.

* * * * *